(12) United States Patent
Kim et al.

(10) Patent No.: US 7,689,425 B2
(45) Date of Patent: Mar. 30, 2010

(54) QUALITY OF SERVICE CALL ROUTING SYSTEM USING COUNSELOR AND SPEECH RECOGNITION ENGINE AND METHOD THEREOF

(75) Inventors: Do-Sung Kim, Seoul (KR); Dong-Soon Min, Gyeonggi-do (KR); Kwan-Sik Yoo, Seoul (KR); Seung-Woo Chung, Gyeonggi-do (KR); Jeong-Hun Lee, Gyeonggi-do (KR)

(73) Assignee: SK Marketing & Company, Co., Ltd., Seoul (KR)

( * ) Notice: Subject to any disclaimer, the term of this patent is extended or adjusted under 35 U.S.C. 154(b) by 1232 days.

(21) Appl. No.: 11/153,660

(22) Filed: Jun. 15, 2005

(65) Prior Publication Data

US 2005/0288927 A1 Dec. 29, 2005

(51) Int. Cl.
*G10L 21/00* (2006.01)
(52) U.S. Cl. ............... 704/270.1; 704/270; 704/275; 704/235; 704/257; 704/243
(58) Field of Classification Search ............ 704/270, 704/275, 235, 260, 257, 243, 231, 270.1
See application file for complete search history.

(56) References Cited

U.S. PATENT DOCUMENTS

| | | | | |
|---|---|---|---|---|
| 5,724,410 A | * | 3/1998 | Parvulescu et al. | 379/88.18 |
| 5,745,550 A | * | 4/1998 | Eisdorfer et al. | 379/52 |
| 6,078,886 A | * | 6/2000 | Dragosh et al. | 704/270 |
| 6,122,614 A | * | 9/2000 | Kahn et al. | 704/235 |
| 6,185,535 B1 | * | 2/2001 | Hedin et al. | 704/270 |
| 6,199,043 B1 | * | 3/2001 | Happ | 704/272 |
| 6,246,990 B1 | * | 6/2001 | Happ | 704/275 |
| 6,249,809 B1 | * | 6/2001 | Bro | 709/217 |
| 6,370,508 B2 | * | 4/2002 | Beck et al. | 705/1 |
| 6,377,925 B1 | * | 4/2002 | Greene et al. | 704/271 |
| 6,490,558 B1 | * | 12/2002 | Kahn et al. | 704/235 |
| 6,584,180 B2 | * | 6/2003 | Nemoto | 379/88.01 |
| 6,594,346 B2 | * | 7/2003 | Engelke | 379/52 |
| 7,006,967 B1 | * | 2/2006 | Kahn et al. | 704/235 |
| 7,318,031 B2 | * | 1/2008 | Bantz et al. | 704/251 |
| 2002/0010616 A1 | * | 1/2002 | Itzhaki | 705/9 |
| 2002/0128821 A1 | * | 9/2002 | Ehsani et al. | 704/10 |
| 2002/0169606 A1 | * | 11/2002 | Bantz et al. | 704/235 |

* cited by examiner

*Primary Examiner*—Vijay B Chawan
(74) *Attorney, Agent, or Firm*—Rabin & Berdo, P.C.

(57) ABSTRACT

A QoS call routing system using a counselor and a speech recognition engine comprises a speech recognition engine for recognizing speech and outputting characters and speech recognition results; a first counselor group terminal for reproducing the client's speech file to a counselor of a first counselor group so that the counselor may recognize the speech when the speech recognition result by the speech recognition engine is less than a reference value; a second counselor group terminal for allowing a counselor of a second counselor group to hear the client's speech so that the counselor may recognize the speech when the recognition by the counselor of the first counselor group has failed; and an IVR server for controlling the engine and terminals to provide information to the client.

14 Claims, 8 Drawing Sheets

QUALITY OF SERVICE CALL ROUTING SYSTEM USING COUNSELOR AND SPEECH RECOGNITION ENGINE AND METHOD THEREOF

BACKGROUND OF THE INVENTION (a) Field of the Invention

The present invention relates to a call routing system. More specifically, the present invention relates to a quality of service (QoS) call routing system and method using a counselor and a speech recognition engine for recognizing a user's spoken information request provided by a wired/wireless communication terminal and providing corresponding information to the user.

(b) Description of the Related Art

As to a general client counseling model in a client counseling system, a client requests information from a counselor through wired/wireless communication, and the counselor refers to information from an information providing server such as a client database and transmits corresponding information to the client via voice or data format. The above-noted system has advantages of accuracy of services and clients' satisfaction since the client listens to all the clients' requests and directly processes them, but the system increases labor costs because the counselor has to directly serve all the services.

When the client accesses an ARS server through wired/wireless communication in the general ARS system, the ARS server provides service menus to the client according to numbers, the client selects a number of a desired service on a wired/wireless terminal, and the ARS server refers to corresponding information and notifies the client of the information. The ARS system generates a lesser amount of costs since the ARS server manages all the services, but the ARS system is inconvenient to the client since the client has to press key buttons on the terminal according to guidance provided by the ARS server after having accessed the ARS server when the client desires to use a service. Also, the client has to listen to guidance until finding the desired service when the ARS system has a large volume of service categories and contents, and in particular, the ARS system is risky and uneasy when the client manipulates the terminal in a vehicle.

In particular, it is essential to provide a speech recognition system to the terminal that is available in vehicles when the client requests a voice service so as to reduce the number of presses of key buttons on the terminal during a ride and guarantee a safer drive, but the speech recognition system is very uncomfortable for the client to use since its recognition rate is degraded when noise during a ride and noise or vibration under general conditions exist, or the speech recognition system receives many words to recognize or has many words that sound similar from among the all the words to recognize.

Further, the speech recognition rate decreases in the case of environments in which it is difficult for the speech recognition system to recognize speech, for example, an environment with heavy noise, an environment for a hands-free kit, an environment with a large volume of words to recognize.

SUMMARY OF THE INVENTION

It is an advantage of the present invention to provide a quality of service (QoS) call routing system using a speech recognition engine and a counselor and a method thereof for providing a new counselor group that hears clients' voice files recorded for speech recognition by a speech recognition engine and establishes recognition values and words in a corresponding database to a speech recognition engine and counselors when receiving an information request from the client and providing corresponding information to the client, thereby increasing the client's satisfaction on speech recognition and minimizing labor costs.

In one aspect of the present invention, a call routing system for providing information requested by a client with a wired/wireless communication terminal by using a counselor and a speech recognition engine, comprises: a speech recognition engine for recognizing speech and outputting corresponding character information and speech recognition results; a first counselor group terminal for reproducing the client's recorded speech file and allowing a first counselor group having a plurality of counselors to hear the reproduced speech file, and displaying a recognition word list recognized by the speech recognition engine so that a counselor of the first counselor group may search information requested by the client and provide corresponding information; a second counselor group terminal for allowing a second counselor groups having a plurality of counselors to directly hear the client's speech so that a counselor of the second counselor group may search information requested by the client and provide corresponding information; and a main server for performing guidance according to a scenario for providing information to the client, recognizing the client's speech input according to the guidance by controlling the speech recognition engine, transmitting the client's recorded speech file and a recognition word list recognized by the speech recognition engine to the first counselor group terminal to thus allow recognition by the counselor of the first counselor group when a recognition result is less than a predefined reference value, and directly call-connecting the second counselor group terminal and the client's wired/wireless communication terminal and allowing a counselor of the second counselor group to directly hear the client's speech to thus allow recognition by the counselor of the first counselor group when the recognition by the counselor of the first counselor group has failed.

The first counselor group terminal comprises: a headset for allowing the counselor of the first counselor group to listen to the reproduced client's recorded speech file; and a computer system for displaying a recognition word list recognized by the speech recognition engine, and providing an information search function to the counselor of the first counselor group who has listened to the client's recorded speech file through the headset.

The second counselor group terminal comprises: a communication terminal allowable to be directly connected to the client's wired/wireless communication terminal; a headset, connected to the communication terminal, for allowing the counselor of the second counselor group to listen to the reproduced client's recorded speech file; and a computer system for providing an information search function to the counselor of the second counselor group who has directly listened to the client's recorded speech file through the headset.

The call routing system further comprises an information providing database for storing various categories of information, searching requested information, and providing corresponding information; and a text-to-speech (TTS) server connected to the main server and converting text data to speech, wherein the main server converts recognition result information transmitted by the speech recognition engine, the first counselor group terminal, or the second counselor group terminal into speech through the TTS server, and provides the speech to the client.

The speech recognition result output by the speech recognition engine is given as a recognition score for the speech recognition, and recognition by the counselor of the first counselor group is performed through the first counselor group terminal when the recognition score is less than the predefined reference value.

The speech recognition engine comprises a speech recognition database for storing basic information for speech recognition, and the speech recognition database stores a list of words recently or frequently used for each client or a list of words frequently used by the total clients.

In another aspect of the present invention, a call routing method for providing information requested by a client with a wired/wireless communication terminal by using a counselor and a speech recognition engine, comprises: a) recognizing speech input by the client by using a speech recognition engine when an information providing request is provided from the client through the wired/wireless communication terminal; b) reproducing the client's recorded speech file to a counselor of a first counselor group and displaying a recognition word list recognized by the speech recognition engine to thus perform recognition by the counselor of the first counselor group, when the speech recognition result is less than a predefined reference value; c) allowing a counselor of a second counselor group to hear the client's speech to thus perform recognition by the counselor of the second counselor group, when the speech recognition by the counselor of the first counselor group has failed in b); and d) searching for information requested by the client and providing the information when the speech recognition result performed in a) is greater than a predefined reference value, recognition by the counselor of the first counselor group is successful in b), or recognition by the counselor of the second counselor group is successful in c).

The recognition result information is selected and input from a recognition word list displayed to the counselor of the first counselor group in b).

The counselor of the first counselor group is controlled to search for recognition information when the recognition word list displayed to the counselor of the first counselor group has no recognition result information in b).

The method comprises: converting the information searched according to the recognized client's speech input in d); and providing the converted speech information to the client.

The information provided to the client includes graphic data, characters, and combined formats of graphic data and characters in d).

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

Figure 1:
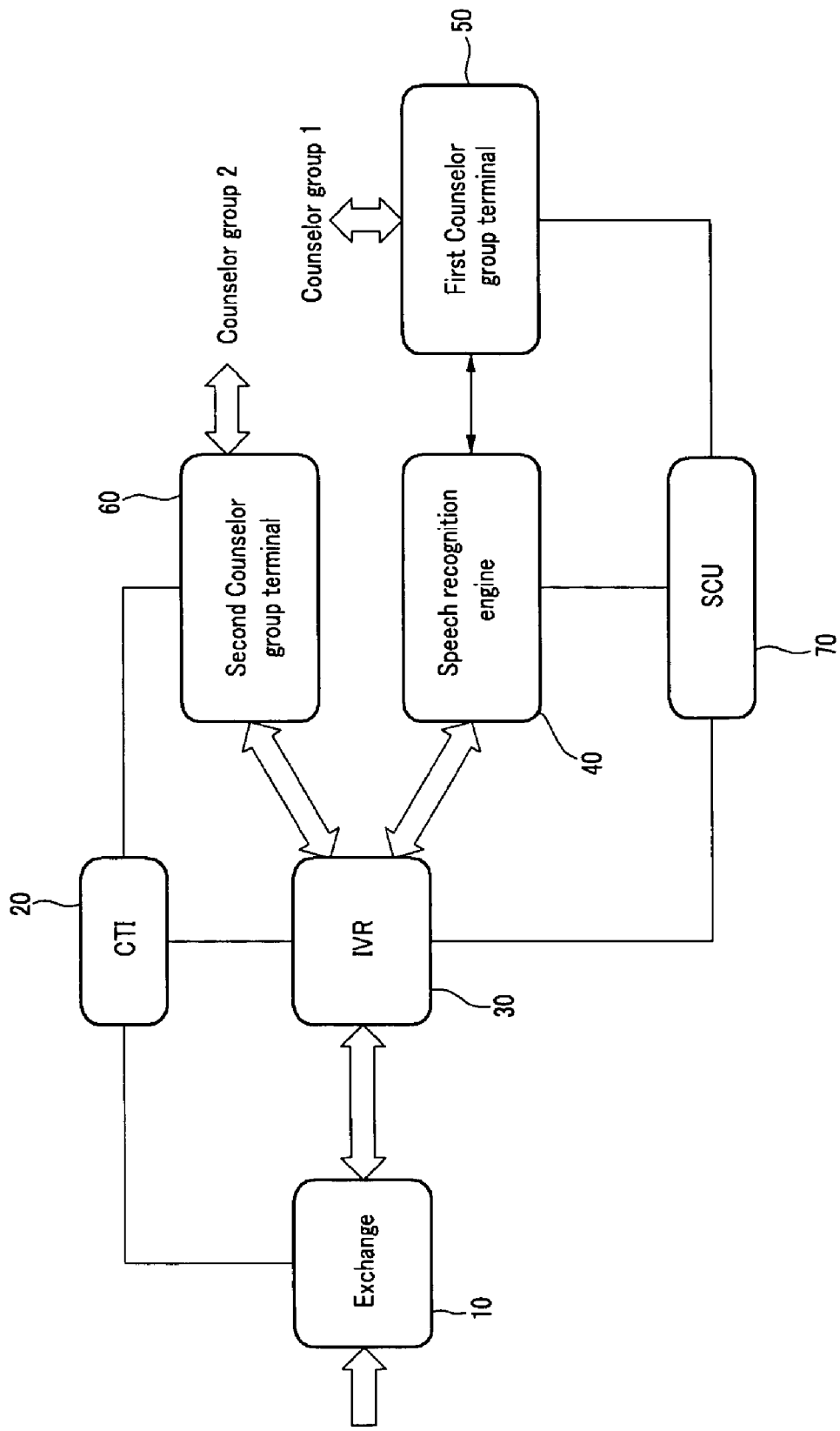
FIG. 1 shows a block diagram for a QoS call routing system using a counselor and a speech recognition engine according to an exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which the same descriptions are provided have the same reference numerals.

A QoS call routing system using a counselor and a speech recognition engine and a method thereof according to an exemplary embodiment of the present invention will be described.

FIG. 1 shows a block diagram for a QoS call routing system using a counselor and a speech recognition engine according to an exemplary embodiment of the present invention.

As shown, the QoS call routing system using a counselor and a speech recognition engine includes an exchange 10, a computer telephony integration (CTI) server 20, an interactive voice response (IVR) server 30, a speech recognition engine 40, a first counselor group terminal 50, a second counselor group terminal 60, and a switching control unit (SCU) 70.

The exchange 10 is directly connected to a wired/wireless communication terminal held by a client through an external exchange of a wired/wireless communication service provider and controls the client to receive a QoS call routing service according to the exemplary embodiment through the client's wired/wireless communication terminal.

The CTI server 20 is connected to the exchange 10, shares information resources between a telephone and a computer, controls connected devices, and forms a network with existing built information to thus provide registered information.

The IVR server 30 is connected to the exchange 10 and the CTI server 20, distributes clients' calls according to control by the CTI server 20, and controls a service for requirements of the clients through the speech recognition engine 40, the first counselor group, and the second counselor group.

The speech recognition engine 40 is connected to the IVR server 30, recognizes clients' speech data transmitted by the IVR server 30, and transmits recognition results to the IVR server 30. In this instance, the speech recognition engine 40 may include a speech recognition database (not illustrated) for storing basic information for speech recognition on the input speech data. The speech recognition database may store a list of words recently or frequently used by each client or a list of words frequently used by the total clients.

The first counselor group terminal 50 is connected to the speech recognition engine 40, and when the speech recognition result by the speech recognition engine 40 fails to reach a predefined reference value, the first counselor group terminal 50 notifies a counselor belonging to the first counselor group of the client's speech file provided by the speech recognition engine 40 and the list of words recognized by the speech recognition engine 40, and transmits results recognized by the counselor to the speech recognition engine 40.

The second counselor group terminal 60 is connected to the IVR server 30, and when speech recognition by the first counselor group through the first counselor group terminal 50 has failed, the second counselor group terminal 60 provides the client's speech to a counselor of the second counselor group so that the counselor thereof may directly listen to the speech, and then transmits results recognized by the counselor to the IVR server 30. In this instance, the counselor of the second counselor group does not directly call the client but directly listens to the client's speech, and hence, a response to the client is performed by the IVR server 30.

The SCU 70 processes status information and controls communication for the IVR server 30, the speech recognition engine 40, and the first counselor group terminal 50.

The QoS call routing system using a counselor and a speech recognition engine according to the exemplary embodiment of the present invention further includes a text-to-speech (TTS) server (not illustrated) for converting text into speech, a client database server (not illustrated) for storing and managing client information, and an information database server (not illustrated) for storing and managing information requested by the client.

Figure 2:
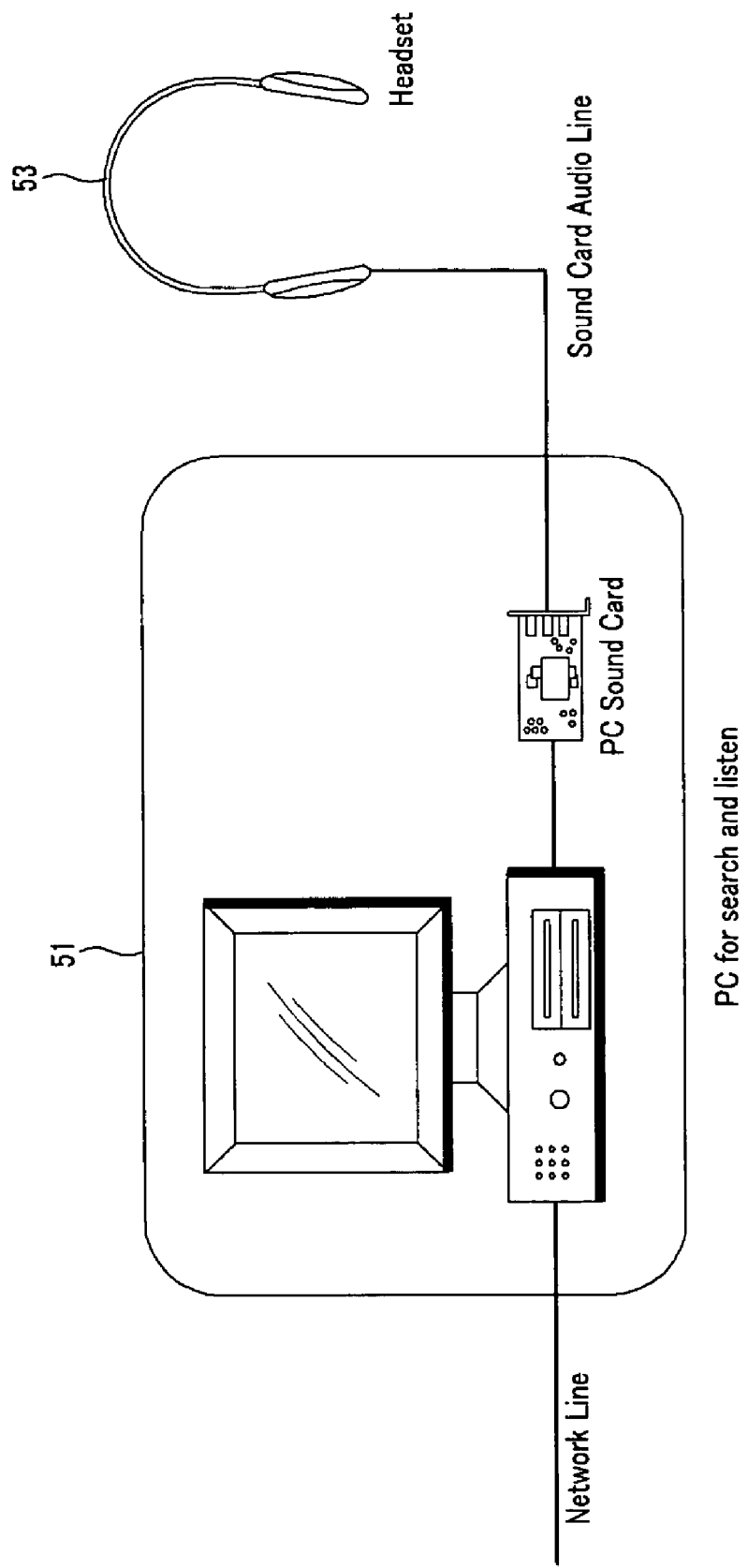
FIG. 2 shows a terminal for a first counselor group shown in FIG. 1.

FIG. 2 shows a terminal for a first counselor group shown in FIG. 1.

Referring to FIG. 2, the first counselor group terminal 50 includes a computer system 51 connected to the speech recognition engine 40 through a network such as a dedicated line, and a headset 53 for allowing the counselor of the first counselor group to hear the speech output by the computer system 51.

When the speech recognition result by the speech recognition engine 40 is below a reference value, the computer system 51 reproduces the client's recorded speech file transmitted by the speech recognition engine 40, controls the counselor of the first counselor group to hear the speech through the headset 53, and displays the client's recorded speech file provided by the speech recognition engine 40 and the list of words recognized by the speech recognition engine 40 through the computer system 51 so that the counselor of the first counselor group may see them. Therefore, the counselor of the first counselor group listens to the client's recorded speech file through the headset 53 to recognize the file, selects a word from the recognition word list displayed on the computer system 51, and transmits recognition results to the speech recognition engine 40. However, when finding no result recognized by the counselor from the recognition word list, the counselor accesses an information database server through the computer system 51 to search for corresponding information and transmits search results to the speech recognition engine 40.

Figure 3:
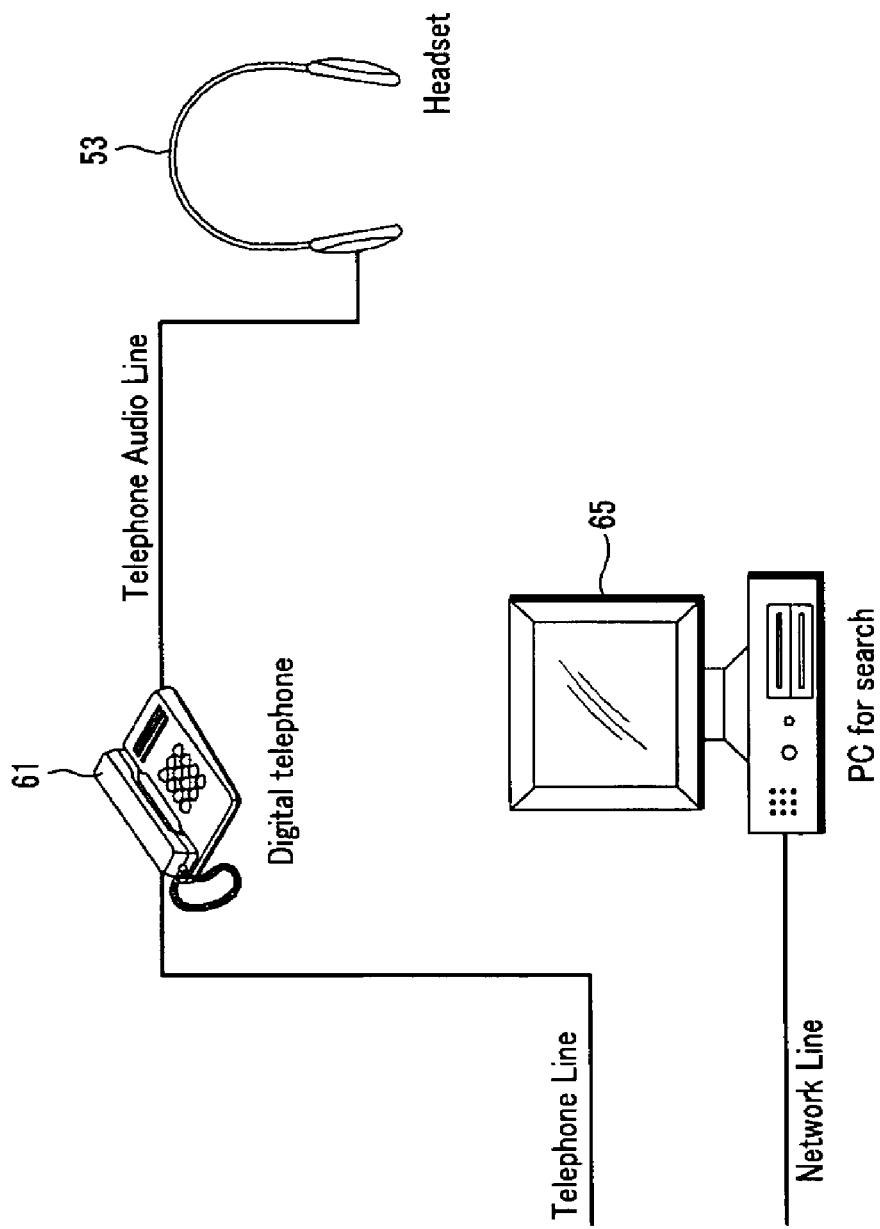
FIG. 3 shows a terminal for a second counselor group shown in FIG. 1.

FIG. 3 shows a terminal for a second counselor group shown in FIG. 1.

Referring to FIG. 3, the second counselor group terminal 60 includes a telephone 61 (e.g., a digital telephone) connected to the IVR server 30 through a telephone line, a headset 63 for allowing a counselor of the second counselor group to hear the speech output by the telephone 61, and a computer system 65 connected to the IVR server 30 through a network such as a dedicated line.

When the result recognized by the first counselor group is found to be a recognition failure while the speech recognition result by the speech recognition engine 40 is below the reference value, the telephone 61 is directly connected to the client's wired/wireless communication terminal, and allows the counselor of the second counselor group to hear the client's requirement information through the headset 63. In this instance, the counselor of the second counselor group does not directly call the client, and the service for the client such as re-inputting requirement information of the client is performed by the IVR server 30. The counselor directly listens to and recognizes the speech of the requirement information input by the client according to the service for the client, searches for corresponding information by accessing the information database server through the computer system 65, and transmits search results to the IVR server 30.

The recognition result by the speech recognition engine 40 is compared with a predefined reference value, and in this instance, the recognition result may be given as a result value of recognized information and recognition score. As to the recognition score, the background portion of Korean Published Application No. 10-2003-0018073 discloses a method for parsing input speech, a method for matching the input speech with an audio model, and a method for calculating the score on a plurality of speech recognition results generated in the matching method, and Korean Published Application No. 10-2002-0012154 discloses a method for converting accuracy of pronunciation generated in the voice by the user, which will not be described for ease and clarification of description.

Figure 4:
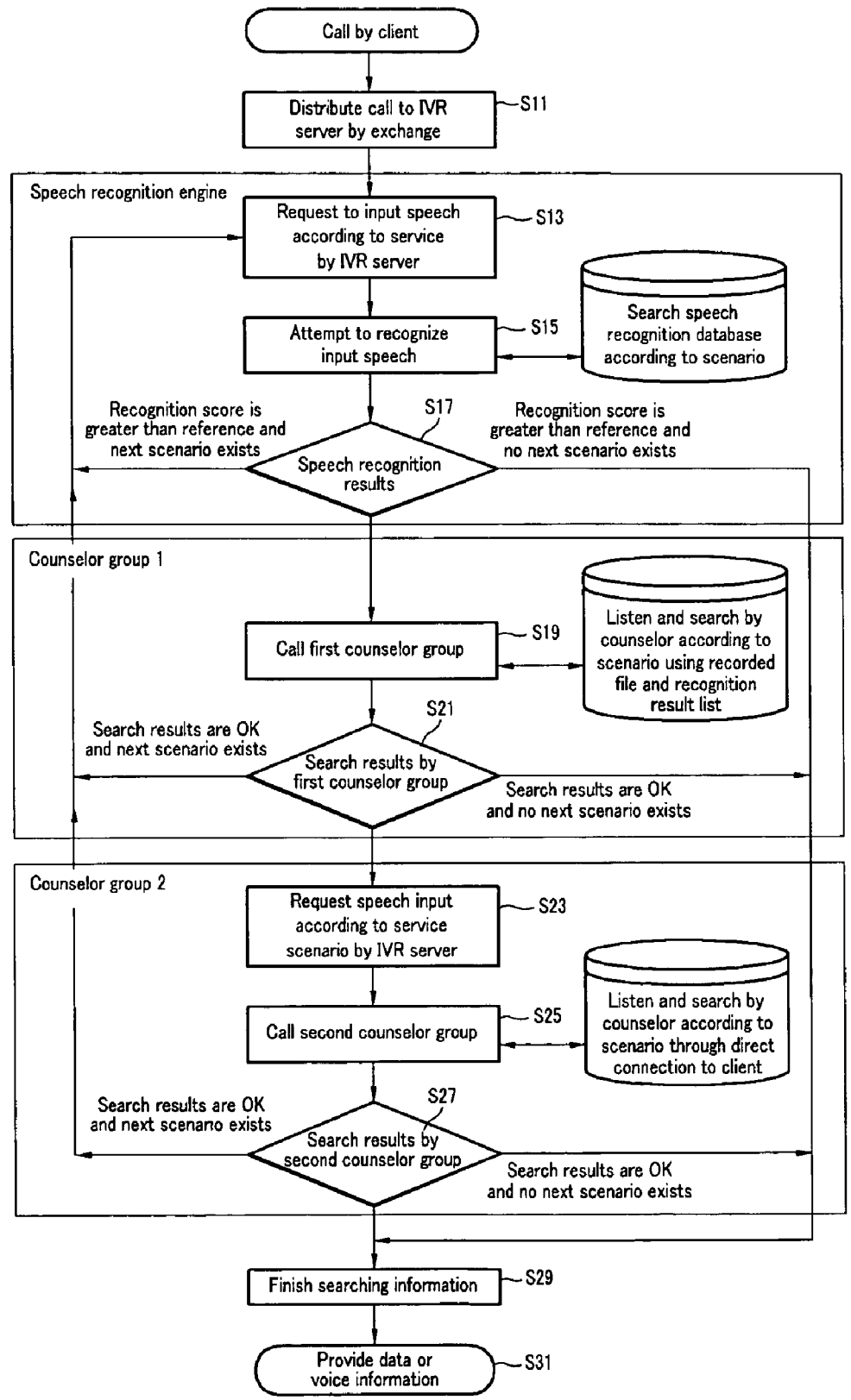
FIG. 4 shows a flowchart for a QoS call routing method using a counselor and a speech recognition engine according to an exemplary embodiment of the present invention.

Referring to FIG. 4, a QoS call routing method using a counselor and a speech recognition engine will now be described in detail.

When the client inputs a predetermined telephone number for connecting to a center through a communication network by using the client's wired/wireless communication terminal or accesses the exchange 10 of the call routing system according to the exemplary embodiment by pressing a hot key on the terminal to which a predetermined telephone number is input, the exchange 10 transfers the received call to the IVR server 30 in step S11.

The IVR server 30 determines whether a client is registered as a member through a client database server by using the client's calling telephone number on the call that is transferred to the IVR server to thus perform a certification process, which is general and obvious to a person skilled in the art and will not be described.

The IVR server 30 requests the client to input speech according to a service scenario on the client's call in step S13, and transmits the input speech to the speech recognition engine 40 so as to attempt speech recognition when the client inputs speech on the speech request according to the scenario.

The speech recognition engine 40 speech-recognizes the client's speech data transmitted by the IVR server 30 in step S15. In this instance, the speech recognition engine 40 may perform speech recognition by searching a speech recognition database following the scenario.

When the recognition score of the speech recognition results is greater than a predefined reference value in step S17, the speech recognition engine 40 transmits the speech recognition results to the IVR server 30, and the IVR server 30 determines that speech recognition is successfully finished, and repeats the above-noted steps S13, S15, and S17 when a next scenario is provided. When the scenario is finished and no next scenario is found, the IVR server 30 finishes searching information by using recognized results in step S29, provides searched information to the client through the exchange 10, and finishes the call in step S31. In this instance, the searched information includes various categories of information to be provided to the client, such as characters, audio, graphic data, and combined formats of characters and graphic data.

When the recognition score is less than the predefined reference value in step S17, the speech recognition engine 40 transmits the client's speech file recorded by the IVR 30 and the list of words recognized by the speech recognition engine 40 to the first counselor group terminal 50 so that they may be recognized by the first counselor group in step S19.

The first counselor group terminal 50 allows the counselor of the first counselor group to hear the client's speech file transmitted by the speech recognition engine 40 through the headset 53, and concurrently displays a recognition word list to the counselor through the computer system 51. Therefore, the counselor of the first counselor group listens to the recorded speech file through the headset 53 to recognize the client's speech, and selects a word when the corresponding word is found in the recognition word list displayed on the computer system 51 according to recognition results, and searches a corresponding information database through the computer system 51 and inputs the searched word when no corresponding word is found. Therefore, when the recognized word is selected or input by the counselor of the first counselor group, the first counselor group terminal 50 transmits corresponding results to the IVR server 30 through the speech recognition engine 40, and the IVR server 30 determines that the speech recognition is successfully finished by the first counselor group in step S21, and repeats the above-noted steps (S13, S15, and S17), or (S13, S15, S17, S19, and S21) when a next scenario is found. When the scenario is finished and no next scenario is found, the IVR server 30 finishes searching information by using recognized results in step S29, provides searched information to the client through the exchange 10, and terminates the call in step S31.

When the counselor of the first counselor group fails to recognize the speech when listening to the recorded file because of the client's inaccurate pronunciation, failure of determining the client's speech due to environmental noise, and failure of search due to absence of information desired by the client according to recognition results by the first counselor group in step S21, the IVR sever 30 directly connects the corresponding client's wired/wireless communication terminal to the second counselor group terminal 60 through the terminal 10 so that the counselor of the second counselor group may directly call the client through the second counselor group terminal 60 and may directly listen to information required by the client. In this instance, the counselor of the second counselor group does not directly call the client, the IVR server 30 transmits a message for re-requesting a speech input to the client according to the service scenario caused by the recognition failure by the first counselor group in step S23, and the counselor then listens to the speech directly input by the client through the second counselor group terminal 60 in step S25. That is, the second counselor group terminal 60 allows the counselor of the second counselor group to hear the speech directly input by the client through the headset 63 connected to the telephone 61, and hence, the counselor of the second counselor group may listen to the client's speech without a direct call to the client. Therefore, the counselor of the second counselor group directly listens to and recognizes the client's speech through the headset 63, searches information requested by the client from the corresponding information database through the computer system 65, and inputs search results. Therefore, when the recognized word is input by the counselor of the second counselor group, the second counselor group terminal 60 transmits corresponding results to the IVR server 30, and the IVR server 30 determines that the speech recognition is successfully finished by the second counselor group in step S27, and repeats the above-noted steps (S13, S15, and S17), (S13, S15, S17, S19, and S21), or (S13, S15, S17, S19, S21, S23, S25, and S27) when a next scenario is found. When the scenario is finished and no next scenario is found, the IVR server 30 finishes searching information by using recognized results in step S29, provides searched information to the client through the exchange 10, and terminates the call in step S31.

Figure 5:
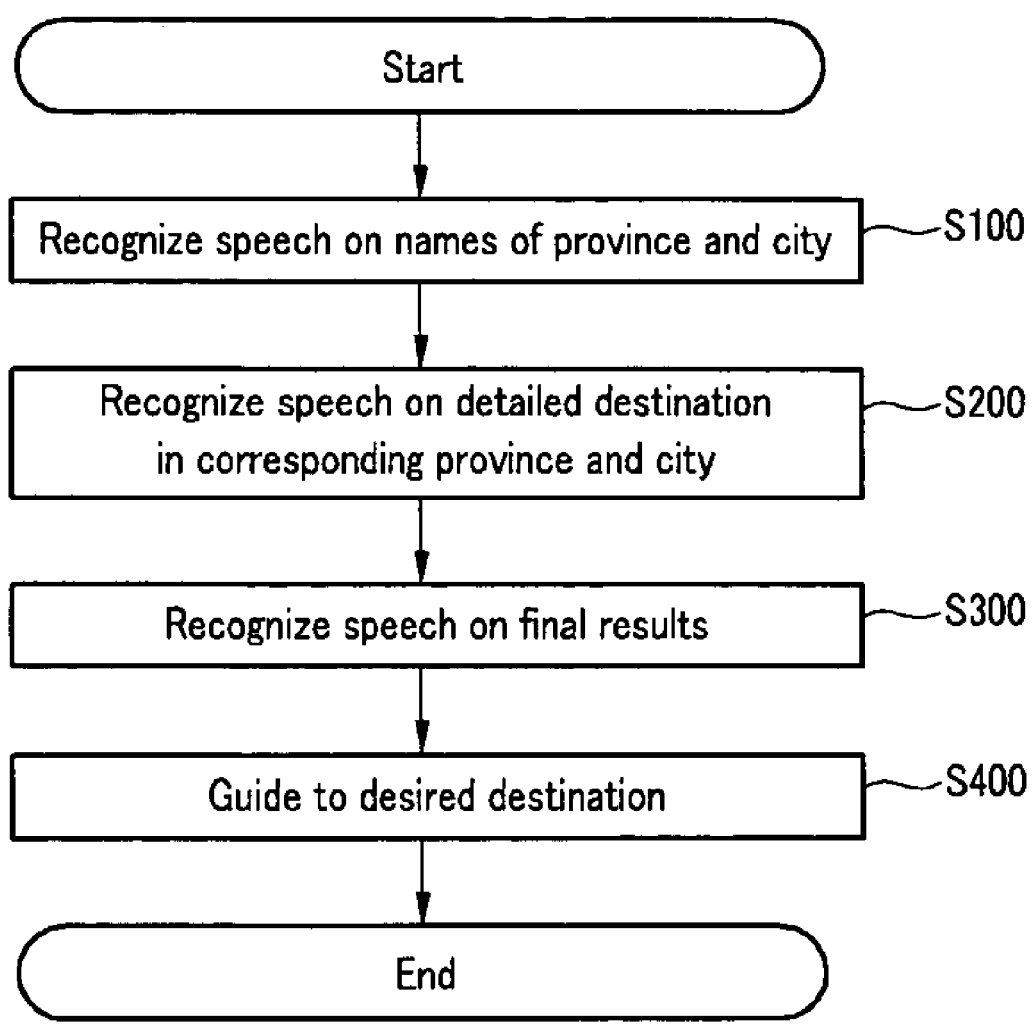
FIG. 5 shows an exemplified QoS call routing method using a counselor and a speech recognition engine according to an exemplary embodiment of the present invention, and in detail, a flowchart for a speech-based destination establishment service.

FIG. 5 shows an exemplified QoS call routing method using a counselor and a speech recognition engine according to an exemplary embodiment of the present invention, in detail, a flowchart for a speech-based destination establishment service.

Referring to FIG. 5, when the client transmits a call to a QoS call routing system using a counselor and a speech recognition engine according to an exemplary embodiment of the present invention by using the client's wired/wireless communication terminal and speaks the names of the province and city of a desired destination according to the speech-based destination establishment service scenario, the QoS call routing system recognizes the corresponding province and city and notifies the client of the same in step S100; when the client speaks a detailed destination in the corresponding province and city, the QoS call routing system recognizes the corresponding destination and notifies the client of the destination in step S200; and when the client speaks checked results according to the scenario for checking the final destination, the QoS call routing system recognizes the corresponding results in step S300, and provides guidance information on the finally checked client's destination to the client in step S400.

In a detailed example, when a client desires to go to the Seoul Arts Center, the client speaks "Seoul" in step S100, the QoS call routing system recognizes it as "Seoul" and notifies the client of recognition result; when the client speaks "Arts Center" in step S200, the QoS call routing system recognizes it, notifies the client of the recognition result, and checks whether the final recognition result is correct; and when the client confirms it and the QoS call routing system recognizes it in step S300, the QoS call routing system calculates a path leading to the desired final destination "Seoul Arts Center" and starts path guidance.

In further detail, referring to FIGS. 6, 7, and 8, a process for recognizing the names of a city and a province in step S100, a process for recognizing a detailed destination in step S200, and a process for recognizing final results in step S300 will be described.

Figure 6:
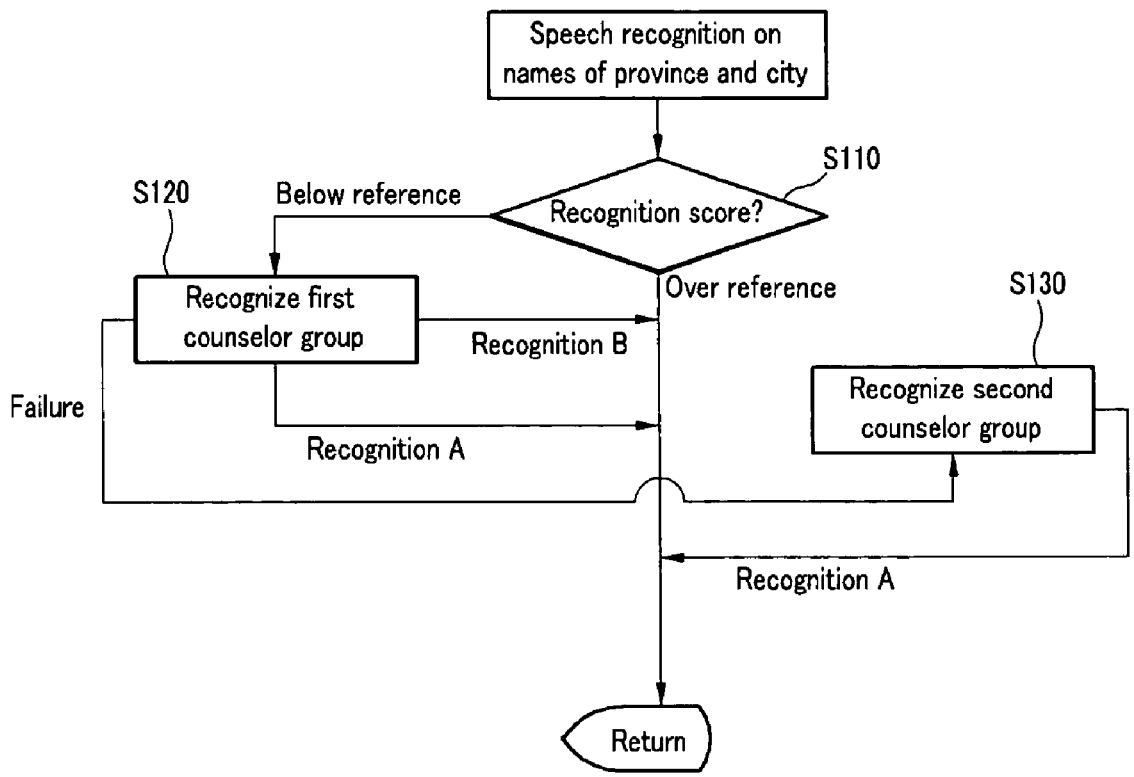
FIG. 6 shows a flowchart for recognizing names of cities and provinces in the speech-based destination establishment service of FIG. 5.

Referring to FIG. 6, when a client speaks the names of a desired province and a city according to a scenario, the speech recognition engine 40 initially attempts recognition, and determines whether a recognition score that is a recognition result is greater than a predefined reference value in step S110, and goes to the step S200 for recognizing a detailed destination when the recognition score is found to be greater than the predefined reference value.

When the recognition score is found to be less than the predefined reference value in step S110, the client's recorded speech file and the list of words recognized by the speech recognition engine 40 are transmitted to the counselor of the first counselor group through the first counselor group terminal 50. The counselor of the first counselor group listens to the client's recorded file through the first counselor group terminal 50, selects a word (Recognition B) when the corresponding word is found in the recognition word list, searches a corresponding database (Recognition A) when no corresponding word is found, and finishes recognizing the input names of the city and the province in step S120, and goes to the step S200 for recognizing a detailed destination.

When the counselor of the first counselor group fails to recognize the speech when listening to the recorded file because of the client's inaccurate pronunciation, failure of determining the client's speech due to environmental noise, and failure of search due to absence of information desired by the client according to recognition results by the first counselor group in step S120, the corresponding client and the counselor of the second counselor group are connected through the client's wired/wireless communication terminal and the second counselor group terminal 60. Therefore, the counselor of the second counselor group is directly connected to the client through a call to directly listen to the information requested by the client, searches the information from the corresponding database in step S120 (Recognition A), and goes to the step S200 for recognizing a detailed destination.

Figure 7:
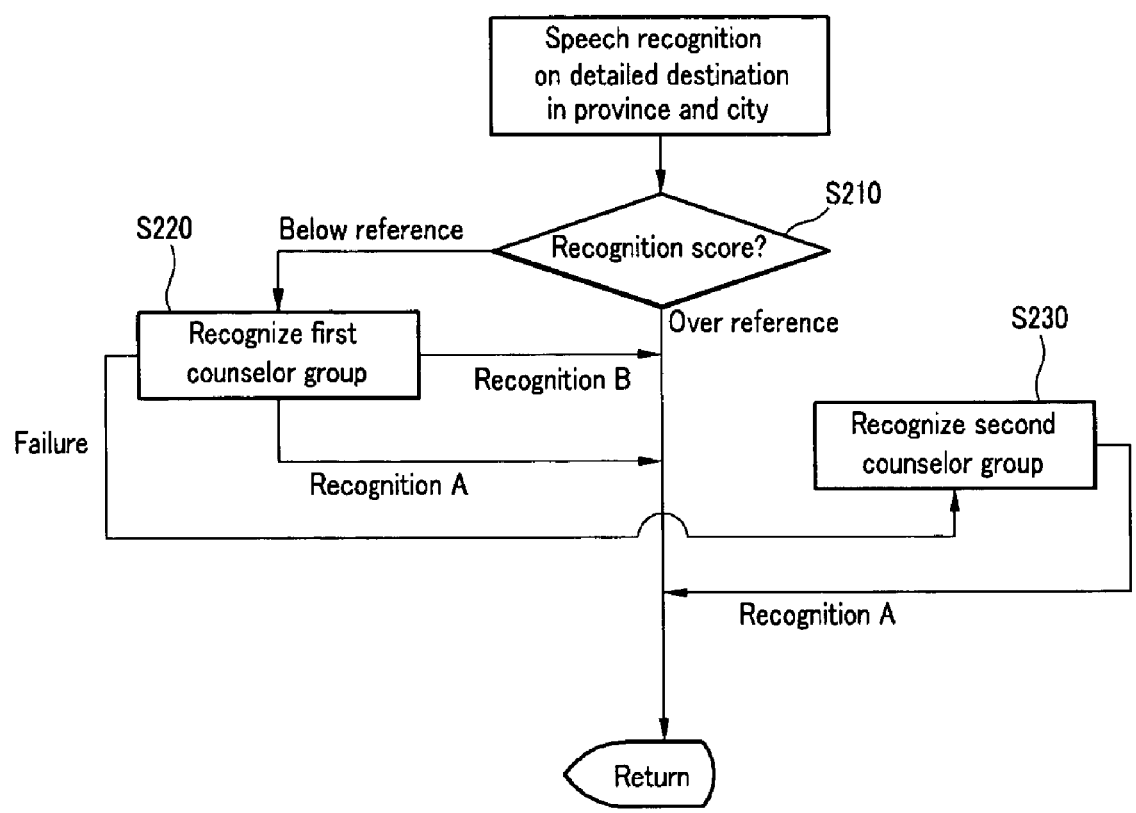
FIG. 7 shows a flowchart for recognizing a detailed destination in the speech-based destination establishment service of FIG. 5.

Referring to FIG. 7, since the names of the province and the city where the client desires to go are recognized, the client is informed of the recognized names of the province and the city, and a detailed destination is input. Therefore, when the client speaks the desired detailed destination, the speech recognition engine 40 initially attempts recognition thereon and determines whether the recognition score that is a recognition result is greater than a predefined reference value in step S210, and goes to the step S300 for finally checking the results when the recognition score is found to be greater than the predefined reference value.

When recognition score is found to be less than the predefined reference value in step S210, the client's recorded speech file and the list of words recognized by the speech recognition engine 40 are transmitted to the counselor of the first counselor group through the first counselor group terminal 50. The counselor of the first counselor group listens to the client's recorded file through the first counselor group terminal 50, selects a word (Recognition B) when the corresponding word is found in the recognition word list, and searches a corresponding database (Recognition A) when no corresponding word is found, and finishes recognizing the input destination in step S220, and goes to the step S300 for finally checking the results.

When the counselor of the first counselor group fails to recognize the speech when listening to the recorded file because of the client's inaccurate pronunciation, failure of determining the client's speech due to environmental noise, and failure of search due to absence of information desired by the client according to recognition results by the first counselor group in step S220, the corresponding client and the counselor of the second counselor group are connected through the client's wired/wireless communication terminal and the second counselor group terminal 60. Therefore, the counselor of the second counselor group is directly connected to the client through a call to directly listen to the information requested by the client, searches the information from the corresponding database in step S220 (Recognition A), and goes to the step S300 for finally checking the results.

Figure 8:
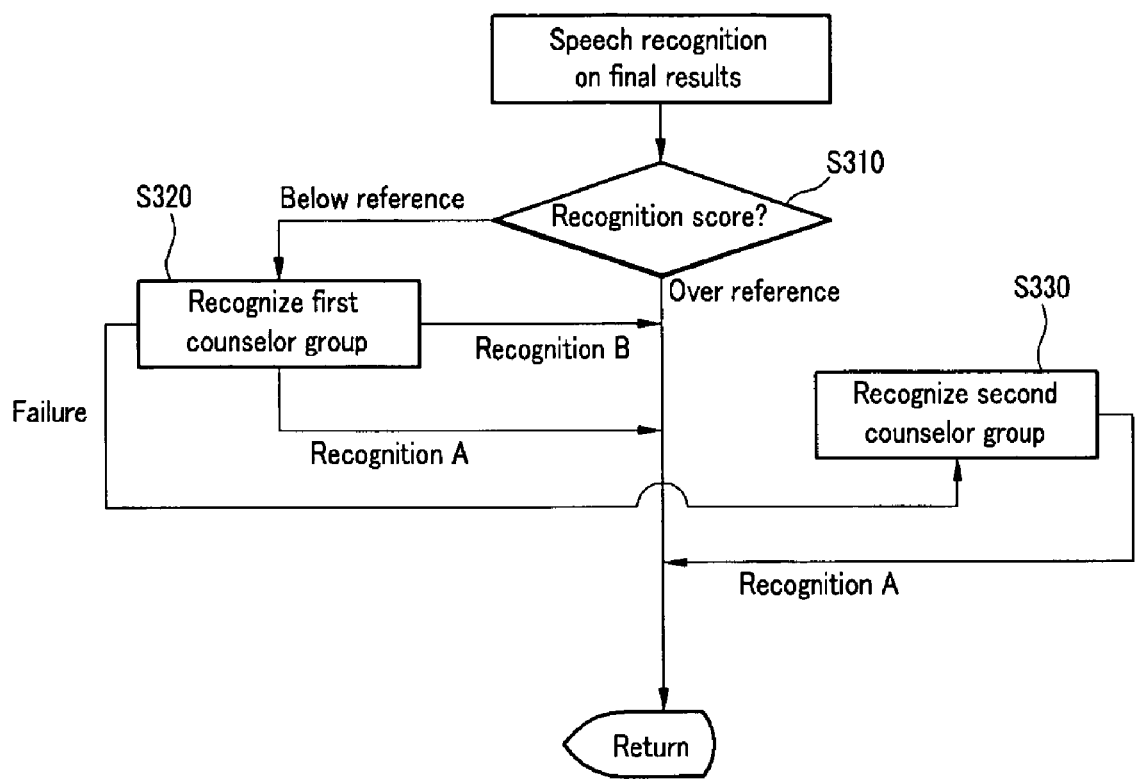
FIG. 8 shows a flowchart for recognizing final results in the speech-based destination establishment service of FIG. 5.

Referring to FIG. 8, since the destination where the client desires to go is recognized, the client is informed of the destination, and a final checked result is input. Therefore, when the client speaks the final checked result, the speech recognition engine 40 initially attempts recognition thereon and determines whether the recognition score that is a recognition result is greater than a predefined reference value in step S310, and goes to the step S400 for guiding to the recognized destination when the recognition score is found to be greater than the predefined reference value.

When the recognition score is found to be less than the predefined reference value in step S310, the client's recorded speech file and the list of words recognized by the speech recognition engine 40 are transmitted to the counselor of the first counselor group through the first counselor group terminal 50. The counselor of the first counselor group listens to the client's recorded file through the first counselor group terminal 50, selects a word (Recognition B) when the corresponding word is found in the recognition word list, searches a corresponding database (Recognition A) when no corresponding word is found, and finishes recognizing the final checked result in step S320, and goes to the step S400 for guiding to the recognized destination.

When the counselor of the first counselor group fails to recognize the speech when listening to the recorded file because of the client's inaccurate pronunciation, failure of determining the client's speech due to environmental noise, and failure of search due to absence of information desired by the client according to recognition results by the first counselor group in step S320, the corresponding client and the counselor of the second counselor group are connected through the client's wired/wireless communication terminal and the second counselor group terminal 60. Therefore, the counselor of the second counselor group is directly connected to the client through a call to directly listen to the information requested by the client, searches the information from the corresponding database in step S220 (Recognition A), and goes to the step S400 for guiding to the recognized destination.

The above-described QoS call routing system using a counselor and a speech recognition engine and the method thereof may be realized in a program and stored in a recording medium (e.g., a CDROM, a RAM, a ROM, a floppy disk, an HDD, and an optical disc) in the computer-readable format.

According to the present invention, when a speech recognition result fails to reach a predefined reference value, a counselor processes a corresponding service so that the client's dissatisfaction caused by failure of speech recognition in the speech recognition service is minimized.

Further, a first counselor group searches information desired by the client by using the client's recorded speech file and a recognition word list recognized by a speech recognition engine, and a second counselor group directly calls the client to directly listen to and recognize the client's speech, thereby minimizing the counselor's processing time, maximizing the client's service satisfaction, and minimizing counselor expenses.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A call routing system for providing information requested by a client with a wired/wireless communication terminal by using a counselor and a speech recognition engine, comprising:

a speech recognition engine for recognizing client's speech and outputting corresponding character information and speech recognition results;

a first counselor group terminal for reproducing a client's recorded speech file transmitted from the speech recognition engine, the client's speech being recorded in the client's recorded speech file, and allowing a first counselor group having a plurality of counselors to hear the reproduced speech file, and displaying a recognition word list recognized by the speech recognition engine so that a counselor of the first counselor group may search information requested by the client and provide corresponding information;

a second counselor group terminal for allowing a second counselor group having a plurality of counselors to directly hear the client's speech so that a counselor of the second counselor group may search information requested by the client and provide corresponding information; and a main server for:
- performing guidance according to a scenario for providing information to the client,
- controlling the speech recognition engine to perform a first recognition of the client's speech,
- when a result of the first recognition by the speech recognition engine is less than a predefined reference value, transmitting the client's recorded speech file and a recognition word list recognized by the speech recognition engine to the first counselor group terminal to thus allow a second recognition by the counselor of the first counselor group, and
- when the second recognition by the counselor of the first counselor group has failed, directly call-connecting the second counselor group terminal and the client's wired/wireless communication terminal and allowing a counselor of the second counselor group to directly hear the client's speech to thus allow a third recognition by the counselor of the second counselor group.

2. The call routing system of claim 1, wherein the first counselor group terminal comprises:
- a headset for allowing the counselor of the first counselor group to listen to the reproduced client's recorded speech file; and
- a computer system for displaying a recognition word list recognized by the speech recognition engine, and providing an information search function to the counselor of the first counselor group who has listened to the client's recorded speech file through the headset.

3. The call routing system of claim 1, wherein the second counselor group terminal comprises:
- a communication terminal allowable to be directly connected to the client's wired/wireless communication terminal;
- a headset, connected to the communication terminal, for allowing the counselor of the second counselor group to listen to the reproduced client's recorded speech file; and
- a computer system for providing an information search function to the counselor of the second counselor group who has directly listened to the client's recorded speech file through the headset.

4. The call routing system of claim 1, further comprising an information providing database for storing various categories of information, searching requested information, and providing corresponding information.

5. The call routing system of claim 1, further comprising a text-to-speech (TTS) server connected to the main server and converting text data to speech,
wherein the main server converts recognition result information transmitted by the speech recognition engine, the first counselor group terminal, or the second counselor group terminal into speech through the TTS server, and provides the speech to the client.

6. The call routing system of claim 1, wherein the result of the first recognition outputted by the speech recognition engine is given as a recognition score for speech recognition, and the second recognition by the counselor of the first counselor group is performed through the first counselor group terminal when the recognition score is less than the predefined reference value.

7. The call routing system of claim 1, wherein the speech recognition engine comprises a speech recognition database for storing basic information for speech recognition.

8. The call routing system of claim 7, wherein the speech recognition database stores a list of words recently or frequently used for each client or a list of words frequently used by the total clients.

9. A call routing method for providing information requested by a client with a wired/wireless communication terminal by using a counselor and a speech recognition engine, comprising:
a) performing a first recognition of speech inputted by the client by using a speech recognition engine when an information providing request is provided from the client through the wired/wireless communication terminal;
b) when a result of the first recognition by the speech recognition engine is less than a predefined reference value, reproducing a client's recorded speech file in which the inputted client's speech is recorded, to a counselor of a first counselor group and displaying a recognition word list recognized by the speech recognition engine to thus perform a second recognition by the counselor of the first counselor group;
c) when the second recognition by the counselor of the first counselor group has failed, allowing a counselor of a second counselor group to hear the client's speech to thus perform a third recognition by the counselor of the second counselor group; and
d) searching for information requested by the client and providing the information when the result of the first recognition is greater than a predefined reference value, the second recognition by the counselor of the first counselor group is successful in b), or the third recognition by the counselor of the second counselor group is successful in c).

10. The call routing method of claim 9, wherein recognition result information is selected and input from a recognition word list displayed to the counselor of the first counselor group in b).

11. The call routing method of claim 9, wherein the counselor of the first counselor group is controlled to search for recognition information when the recognition word list displayed to the counselor of the first counselor group has no recognition result information in b).

12. The call routing method of claim 9, wherein the method comprises:
converting the information searched according to the recognized client's speech by the first, second or third recognition in d); and
providing the converted speech information to the client.

13. The call routing method of claim 9, wherein the information provided to the client includes graphic data, characters, and combined formats of graphic data and characters in d).

14. In a call routing method for providing information requested by a client with a wired/wireless communication terminal by using a counselor and a speech recognition engine, a recording media for storing a program for realizing the functions comprising:
a) performing a first recognition of speech inputted by the client by using a speech recognition engine when an information providing request is provided from the client through the wired/wireless communication terminal;

b) when a result of the first recognition by the speech recognition engine is less than a predefined reference value, reproducing a client's recorded speech file in which the inputted client's speech is recorded, to a counselor of a first counselor group and displaying a recognition word list recognized by the speech recognition engine to thus perform a second recognition by the counselor of the first counselor group;

c) when the second recognition by the counselor of the first counselor group has failed, allowing a counselor of a second counselor group to hear the client's speech to thus perform a third recognition by the counselor of the second counselor group; and d) searching for information requested by the client and providing the information when the result of the first recognition is greater than a predefined reference value, the second recognition by the counselor of the first counselor group is successful in b), or the third recognition by the counselor of the second counselor group is successful in c).

* * * * *